(12) United States Patent
Jones et al.

(10) Patent No.: US 8,500,876 B2
(45) Date of Patent: Aug. 6, 2013

(54) AUTOMATIC AIR DEHYDRATOR WITH OFFSITE DATA MANAGEMENT

(75) Inventors: Thaddeus M. Jones, Bremen, IN (US); Lawrence W. Holz, Cassopolis, MI (US); Robert E. Tax, New Orleans, LA (US)

(73) Assignee: MSX, Incorporated, South Bend, IN (US)

( * ) Notice: Subject to any disclaimer, the term of this patent is extended or adjusted under 35 U.S.C. 154(b) by 415 days.

(21) Appl. No.: 12/635,197

(22) Filed: Dec. 10, 2009

(65) Prior Publication Data

US 2011/0139011 A1      Jun. 16, 2011

(51) Int. Cl.
*B01D 53/02* (2006.01)

(52) U.S. Cl.
USPC ............... 96/109; 96/117; 96/121; 96/133; 95/10

(58) Field of Classification Search
USPC .............. 95/10; 96/109, 117, 121, 133
See application file for complete search history.

(56) References Cited

U.S. PATENT DOCUMENTS

| | | | | |
|---|---|---|---|---|
| 4,504,286 A * | 3/1985 | Carlisle et al. | | 95/10 |
| 4,786,295 A * | 11/1988 | Newman et al. | | 96/400 |
| 4,941,894 A * | 7/1990 | Black | | 95/14 |
| 5,632,802 A * | 5/1997 | Grgich et al. | | 95/10 |
| 5,667,558 A * | 9/1997 | Bryan et al. | | 95/8 |
| 5,681,370 A * | 10/1997 | McMahon | | 95/105 |
| 6,077,330 A * | 6/2000 | Sabelstrom | | 95/11 |
| 6,375,722 B1 * | 4/2002 | Henderson et al. | | 96/112 |
| 6,767,390 B2 * | 7/2004 | Battershell et al. | | 96/111 |
| 6,799,430 B2 * | 10/2004 | Steiner | | 62/93 |
| 6,979,362 B2 * | 12/2005 | Jackson | | 96/218 |
| 7,189,281 B2 * | 3/2007 | Kim | | 95/187 |
| 7,279,026 B1 * | 10/2007 | Fresch et al. | | 95/124 |
| 7,292,723 B2 * | 11/2007 | Tedesco et al. | | 382/159 |
| 7,361,206 B1 * | 4/2008 | Jahn et al. | | 95/52 |
| 2002/0134234 A1 * | 9/2002 | Kalbassi et al. | | 95/11 |
| 2003/0116020 A1 * | 6/2003 | Hedstrom | | 95/286 |
| 2004/0187451 A1 * | 9/2004 | Suzuki et al. | | 55/385.1 |
| 2004/0240981 A1 * | 12/2004 | Dothan et al. | | 414/795.4 |
| 2005/0150377 A1 * | 7/2005 | Friday et al. | | 95/96 |
| 2006/0005704 A1 * | 1/2006 | Zhou et al. | | 95/117 |

* cited by examiner

*Primary Examiner* — Christopher P Jones
(74) *Attorney, Agent, or Firm* — Taylor IP, P.C.

(57) ABSTRACT

An air dehydrator system for supplying a source of dehydrated air includes an offsite data management system; at least one data network; and an air dehydrator located remote from the offsite data management system. The dehydrator includes a housing containing at least one drying canister; a pressurized air source; and a control circuit coupled with the pressurized air source. The control circuit is also in communication via the at least one data network with the offsite data management system. The control circuit controls operation of the pressurized air source dependent upon control by the offsite data management system.

14 Claims, 3 Drawing Sheets

AUTOMATIC AIR DEHYDRATOR WITH OFFSITE DATA MANAGEMENT

BACKGROUND OF THE INVENTION

1. Field of the Invention

The present invention relates to air dehydrators, and, more particularly, to automatic air dehydrators.

2. Description of the Related Art

Air dehydrators remove moisture from ambient air. For example, air dehydrators may be used to remove moisture from within waveguide tubes, also referred to as transmission lines, within a satellite earth station antenna system.

Unpressurized transmission lines allow the entry of moist ambient air through leaking seals and cracks. When the line passes from one environment to another (such as entering a shelter from the antenna outside) or when there is a change in existing environmental conditions (such as a weather front or nightfall) the pressure and/or temperature changes in the air will result in the collection of water. This is normally the result of the ambient temperature dropping below the dew point. Water in transmission lines causes corrosion, voltage arcing and increased voltage standing wave ratio (VSWR). These conditions reduce system performance.

SUMMARY OF THE INVENTION

The present invention provides an automatic air dehydrator which prevents the accumulation of moisture in transmission lines by maintaining the pressure and dew point of the air inside the line. Supplying low pressure dry air, the automatic dehydrator of the present invention keeps waveguides, air-dielectric coaxial cable and related components used in earth station and terrestrial UHF and microwave communication systems dry.

The invention in one form is directed to an air dehydrator system for supplying a source of dehydrated air. The air dehydrator system includes an offsite data management system; at least one data network; and an air dehydrator located remote from the offsite data management system. The dehydrator includes a housing containing at least one drying canister; a pressurized air source; and a control circuit coupled with the pressurized air source. The control circuit is also in communication via at least one data network with the offsite data management system. The control circuit controls operation of the pressurized air source dependent upon control by the offsite data management system.

The invention in another form is directed to a method of operating an air dehydrator system for supplying a source of dehydrated air. An air dehydrator is provided which includes a housing containing at least one drying canister; a pressurized air source; and a control circuit coupled with the pressurized air source. Operation of the air dehydrator is controlled with an offsite data management system coupled with the air dehydrator via at least one data network, wherein the control circuit controls operation of the pressurized air source dependent upon control by the offsite data management system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
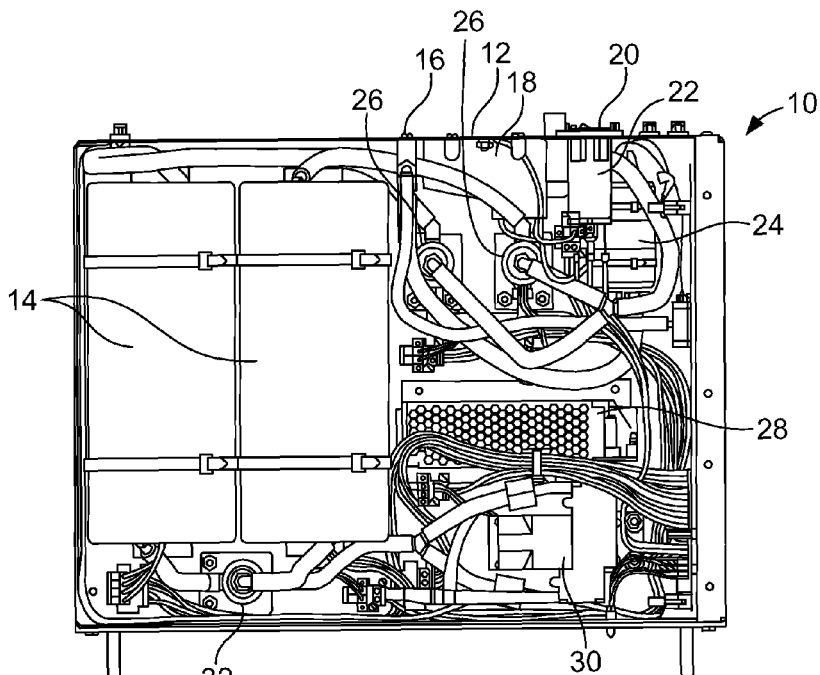
FIG. 1 is a top view of an automatic air dehydrator of the present invention, with the top cover removed.

Referring now to the drawings, and more particularly to FIG. 1, there is shown an automatic dehydrator 10 of the present invention. The automatic dehydrator 10 of the present invention is a low pressure automatic air dehydrator. Low pressure air provides personnel and equipment safety along with energy efficiency.

Dehydrator 10 generally includes a housing 12, a pair of drying canisters 14, an outlet manifold 16, an evaporator tray 18, a power switch 20, an AC power supply module 22, a dew point sensor 24, a pair of outlet solenoids 26, an AC switching power supply 28, an air compressor 30 and an inlet solenoid 32. Activated alumina is used as the drying agent within drying canisters 14. Alumina, or aluminum oxide, is an energy efficient thermal conductor with a long life expectancy.

Figure 2:
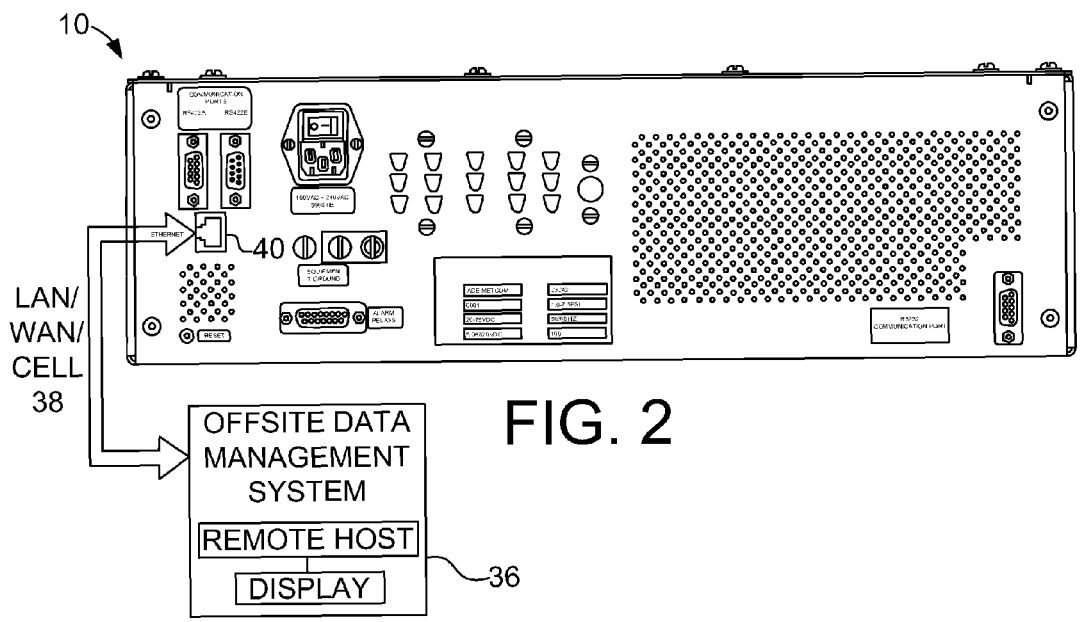
FIG. 2 is a rear view of the air dehydrator shown in FIG. 1.
Figure 3A:
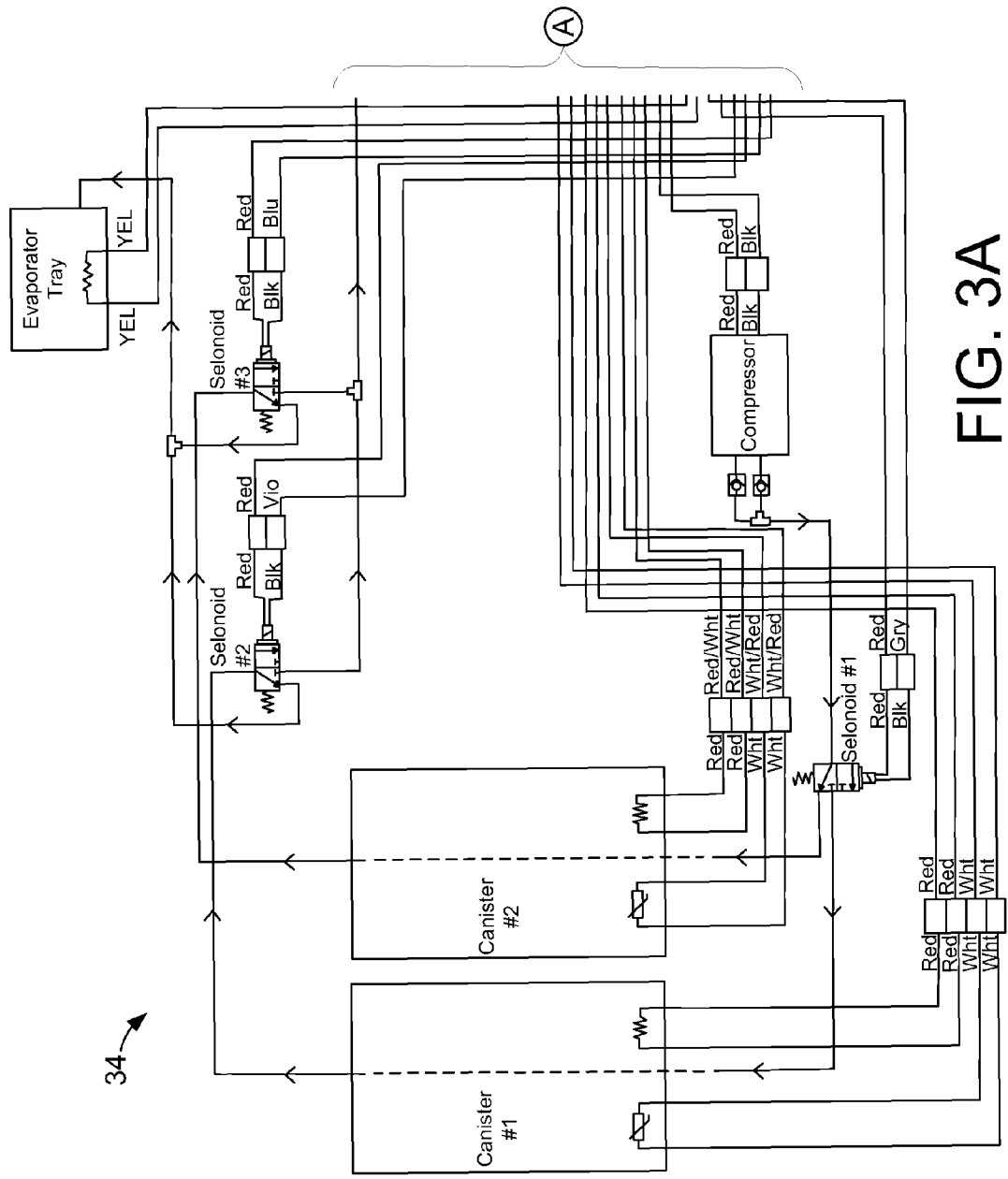
FIGS. 3A and 3B illustrate an electrical schematic of the air dehydrator shown in FIGS. 1 and 2.
Figure 3B:
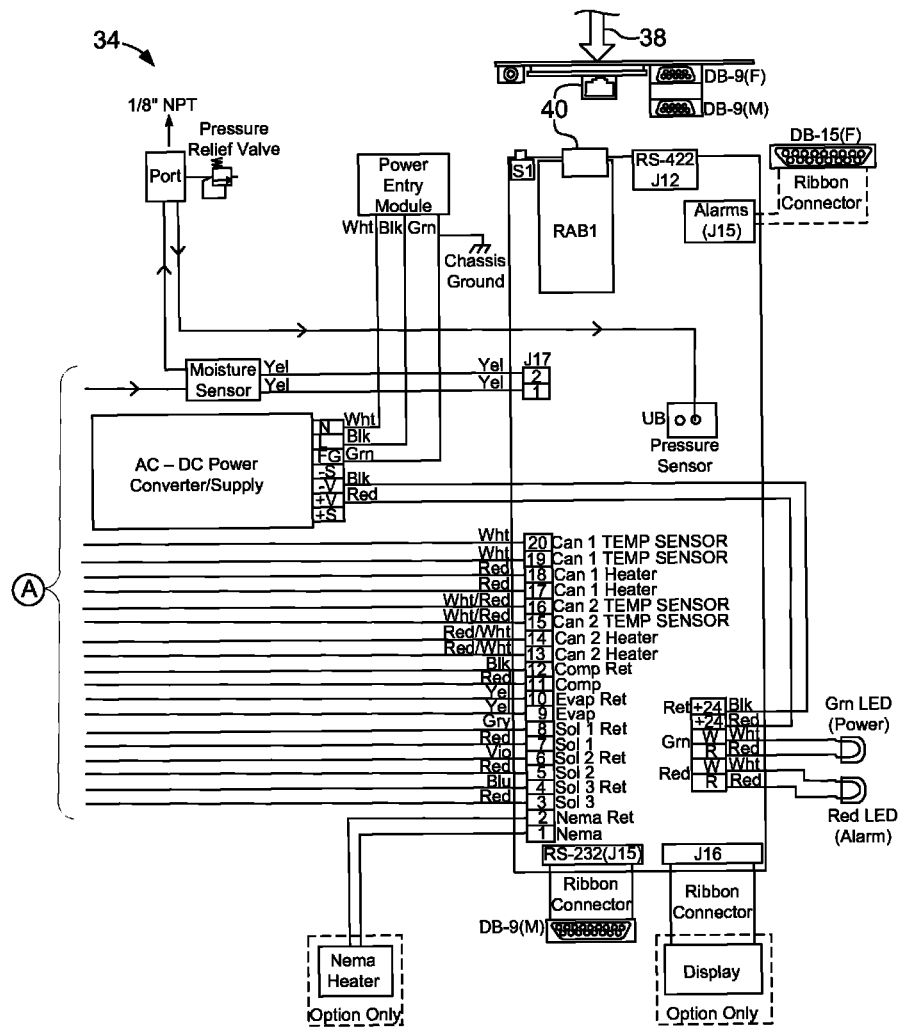

According to an aspect of the present invention, dehydrator 10 also includes a control circuit 34 which may be carried on a main computer board (not visible in FIG. 1 but shown schematically in FIG. 3). The control circuit 34 is coupled with and controls all controllable mechanical, electrical and electronic components of dehydrator 10, such as sensors (described hereinafter, and including dew point sensor 24), compressor 30, outlet solenoids 26 and inlet solenoid 32. The control circuit 34 is coupled with an offsite data management system 36 (FIG. 2) via suitable connections, such as a local area network (LAN), wide area network (WAN) and/or cellular telephone connection (collectively designated 38).

The automatic dehydrator 10 of the present invention utilizes a single computer board which includes the microprocessor, the pressure sensor and I/O connection for both internal control and external communications. The microprocessor controls all internal dehydrator functions. It acts on data collected from various sensors to control operation of the compressor, absorption canister heaters and solenoid valves. It monitors system operation and generates status and alarm conditions which are communicated via LED indicators (power and summary alarm), programmable alarm relays, serial I/O interfaces (RS-422 and RS-232), and through the communications module. The communications module is a plug-in board that controls Ethernet networking including Simple Network Management Protocol (SNMP), the web interface, User Datagram Protocol (UDP) and Trivial File Transfer Protocol (TFTP). The main computer board includes the pressure sensor and ambient temperature sensor and has a display port for use with optional display interfaces.

The automatic dehydrator 10 of the present invention has five internal sensors. There are three temperature sensors, the ambient air temperature sensor on the computer board and a temperature sensor on the housing of each drying canister. A pressure sensor located on the computer board measures the discharge air pressure. Lastly, dew point sensor 24 measures the moisture levels in the discharge air.

On an Ethernet network, the automatic dehydrator 10 primarily uses the UDP network protocol for communication between an automatic dehydrator and one or more other similarly configured automatic dehydrators. UDP is also the protocol that will be used to communicate between an automatic dehydrator and an ASM-1 smart manifold (TM, which is manufactured and sold by the assignee of the present invention). M&C systems may also use UDP along with, or instead of, SNMP.

Automatic dehydrator 10 includes support for both Ethernet network communications (see Ethernet port 40) and legacy serial communications. The Ethernet capabilities within the automatic dehydrator of the present invention include support for the web interface, SNMP, UDP and TFTP. It allows for monitoring and configuration of the dehydrator as well as providing a means for upgrading the dehydrator's software and firmware in the field.

The serial capabilities within the automatic dehydrator of the present invention include legacy support for the Scientific-Atlanta (S-A) protocol used in previous ADH dehydrators. Both RS-422/485 and RS-232 ports are provided for the greatest degree of compatibility.

The automatic dehydrator 10 of the present invention has three configurable serial communication ports: an RS-422/485 male port, an RS-422/485 female port and an RS-232 female port. Each port communicates at 9600 baud by default but may be configured as a "slow" port and communicate at 1200 baud. Only the RS-422/485 female port can be configured to use pull-ups or not; the RS-422/485 male port always has pull-ups.

Devices intending to communicate with the automatic dehydrator 10 using one of its three serial ports must be configured to use a matching baud rate as the port to which it is connected. Additionally, in the embodiment shown, the connecting device needs to be configured for seven data bits, one stop bit and even parity.

The automatic dehydrator 10 of the present invention provides serial communications for directly connecting one dehydrator to another or for compatibility with legacy M&C systems. There are four configurable modes of operation: standard mode, terminal mode, master mode and unused. Standard mode complies with the Scientific Atlanta (S-A) protocol. In terminal mode, the unit responds in straight ASCII. Terminal mode should be used when the unit is accessed by a dumb terminal. Master mode allows a port to be used to set an automatic dehydrator as the controlling dehydrator for a standard mode dehydrator. The standard mode dehydrator, or slave, or may be a different automatic dehydrator, such as an ADH-2A COM™ or an ADH-3COM™, each sold by the assignee of the present invention. If a port is not being used it may be configured as unused.

The automatic dehydrator of the present invention features Ethernet network communications as well as RS-422 and RS-232 serial communications for legacy support. The primary protocols utilized by the Ethernet communications are SNMP, HTTP, UDP and TFTP. The IP address can be set via DHCP or static addressing. The factory setting is a static IP address of 192.168.52.9 and subnet 255.255.255.0. The RS-422 and RS-232 ports both support SA protocol communications.

The automatic dehydrator of the present invention may be configured and monitored remotely with an offsite data management system via an internet (e.g., web browser) interface. Initial set up is typically done with a stand-alone PC or laptop configured for use in the 192.168.52.0 network. A typical IP address for the configuring host could be, e.g., 192.168.52.1 with a subnet mask of 255.255.255.0.

The automatic dehydrator of the present invention may operate independent of the offsite data management system, but can also be monitored, controlled and/or overridden by the offsite data management system. An operator can optionally control the automatic dehydrator at the dehydrator through an operator input such as input keys, a touch screen, a keypad, etc.

The initial internet protocol (IP) address of the automatic dehydrator 10 is 192.168.52.9 with a subnet of 255.255.255.0. A user may open a web browser and connect to this IP address. From the configuration page link, the user can configure the operational pressure limits, pressure alarms, SNMP parameters and the IP configuration.

To configure the serial ports on the back of the unit, a user may click on the communications configuration page link. There are three ports labeled "RS422A", RS422B" and "RS232" on the back of the dehydrator and each can be configured.

The automatic dehydrator 10 includes three alarm relays for external annunciation of alarm conditions. These are configured at the factory for SUMMARY ALARM, LOW PRESSURE ALARM and OVER PRESSURE ALARM but each alarm relay can be programmed to any of the alarm conditions tracked by the automatic dehydrator of the present invention.

Standard display configuration includes two LED indicators on the front panel for POWER and ALARM. The web interface provides detailed status information display and allows for unit configuration.

The automatic dehydrator 10 allows for user inputs and the configuration of many of the operational parameters. User defined operational and alarm settings, with their default values, include the following:

A) High Limit Target Pressure: The high set point of the operating pressure range for the dehydrator. This is the pressure the unit will target during compressor operation. The actual turn off pressure is adjusted in software every pressurization cycle after determining the rate of pressure change during that cycle. This software compensation for rate of pressure change during pressurization minimizes compressor undershoot. High Limit Target Pressure must be between 0.20 psig and 7.5 psig (14 mbar and 517 mbar). The factory default High Limit Target Pressure is 0.50 psig (34.5 mbar).

B) Low Limit Pressure: The low set point of the operating pressure range for the dehydrator. This is the pressure at which the unit will turn off the compressor during compressor operation. Low Limit Pressure must be less than the High Limit Target Pressure by at least 0.1 psig (7 mbar). The factory default Low Limit Pressure is 0.30 psig (21 mbar).

C) High Pressure Alarm Level: The pressure at which a high pressure will cause an alarm condition. The High Pressure Alarm must be higher than the Maximum Pressure. The factory default is 1.5 psig (103.5 mbar).

D) Low Pressure Alarm Level: The pressure at which a low pressure will cause an alarm condition. The Low Pressure Alarm must be less than the Minimum Pressure. The factory default Low Pressure Alarm is 0.15 psig (10 mbar).

E) Display Units: The pressure unit displayed by the automatic dehydrator is configurable as either English (psig) or SI (metric, millibars). The factory default is English.

F) Alarm Relays: There are three alarm relay outputs that may be configured to alarm for any of the dehydrator's alarm or warning conditions. All three relays are energized at power up and de-energized during an alarm condition or when power is removed from the dehydrator. The factory defaults are:

Alarm Relay 1—Summary Alarm
Alarm Relay 2—Low Pressure
Alarm Relay 3—Over Pressure Alarm G) High Duty Cycle Alarm Level: The set point at which the automatic dehydrator will alarm for a high duty cycle. The factory default is 50%.

A sensor in the form of a solid state pressure transducer senses discharge pressure. The transducer's signal is digitized and processed to control the compressor. The compressor operates while the pressure is between the Maximum Pressure and Minimum Pressure. The factory default pressure range is between 0.30 psig and 0.5 psig (21 mbar and 34.5 mbar).

If the temperature in the automatic dehydrator is measured at less than 32° F. (0° C.) the dehydrator will not turn on the compressor. For NEMA units an enclosure heater is energized any time the temperature in the dehydrator is below 40° F. (4.4° C.).

A High Pressure Alarm occurs if the pressure exceeds the configured High Pressure Alarm level for more than 30 seconds. The factory default High Pressure Alarm level is 1.5 psig (103.5 mbar). A mechanical pressure safety relief valve provides over pressure protection independent of the electronic system. The set point of the safety relief valve is 8 psig (552 mbar).

The compressor duty cycle and the discharge pressure are available for display. Typically the system should be tight enough to limit the duty cycle to less than 20%. Dehydrator life decreases as duty cycle increases. A Duty Cycle Alarm occurs if the duty cycle exceeds the configured Duty Cycle Alarm level. The factory default Duty Cycle Alarm level is 50%.

The automatic dehydrator of the present invention has three conditions that will mark a drying canister for regeneration. These conditions will occur on a trigger of moisture, time or start up.

During normal operation regeneration begins when the dew point sensor determines that the discharge air from the canister is "wet." What is considered a wet condition will vary with environmental conditions.

The amount of time that a drying canister is in service is recorded by the automatic dehydrator. As a precaution, if a drying canister stays in service for 200 hours the automatic dehydrator will place that drying canister into regeneration even though sensed moisture has not reached levels that would be considered wet. This ensures that the drying agent is periodically regenerated even in low dew point conditions to extend the life of the drying agent and ensure peak operation of the dehydrator.

When power is initially applied to automatic dehydrator 10, operation begins with the use of one drying canister. The discharge air is monitored for moisture for a short time. The first drying canister is taken out of service and the other drying canister is brought into service. If the first drying canister was determined to be wet, it is placed in a regeneration cycle, otherwise it is placed in standby. The second absorption canister is likewise tested. If the second drying canister is found to be wet, the first drying canister is brought back into use and the second drying canister is regenerated. The normal regeneration cycle is then entered. If both drying canisters are found to be wet, the drying canister remains in service while the first is regenerated and the dew point alarm is issued.

Regeneration of the drying canister is controlled by the main processor. A temperature sensor in the form of a thermocouple monitors the temperature of the drying canister. The drying canister is heated until the desired temperature is obtained. The drying canister and its contents are allowed to soak at this temperature for approximately two and one-half hours. The drying canister is then purged by pressurized air into the internal evaporator tray, eliminating the need for a drain line.

If the drying canister fails to reach the desired temperature it is declared dead and an error is issued. The drying canister is allowed six (6) hours to cool. If it fails to cool to less than 18° F. (10° C.) above the ambient temperature then the unit is declared dead and an error is issued.

Status Information for the automatic dehydrator is obtained using either the simple web interface or by querying the dehydrator via SNMP. Optionally the dehydrator may be queried using the S-A protocol via one of the serial ports on the back of the units.

The automatic dehydrator of the present invention can be switched between online and standby mode either through the web interface, by issuing an SNMP command or by issuing a standby command using the SA Protocol. The dehydrator can only be placed into standby at the front panel if the optional front panel display has been installed.

During operation, the automatic dehydrator 10 works best supplying dry air in a flowing system, where the dehydrator completely replaces the air on a regular, albeit leisurely, basis. Consequently, the equipment being supplied dry air should be slightly leaky. For a waveguide, this is best accomplished by slightly opening a purge valve at the window end of the system. Likewise, air dielectric coaxial cable should be equipped with a valve at the far end which can be set to allow a small leak. Many systems will have sufficient normal leakage that such actions may be unnecessary. For optimal performance and life expectancy of the dehydrator, a duty cycle between 1% and 20% is recommended.

The automatic dehydrator of the present invention has check valves in the air path and a pressure relief valve. A tightly sealed system may experience a pressure increase with a rise in ambient temperature. The automatic dehydrator of the present invention will relieve such buildup should it reach 8 psig (552 mbar) but it is advised the automatic dehydrator not be used as the only means of overpressure protection in any but the smallest of systems.

Air is dehydrated by passing it through a drying canister containing the drying agent. The dried air is delivered to the communications equipment through a connection in the rear panel. The moisture is removed from the drying canisters by heat. The standard unit provides dry air at 0.5 psig (34.5 mbar) and is capable of delivering 26 cubic feet of air per hour (12.3 liters per minute). Output pressure is field configurable up to 7.5 psig (517 mbar).

Two drying canisters are employed to provide a continuous supply of dried air. One unit is active while the other is in standby or being regenerated. Under normal circumstances, the maximum dew point of the air is −40° C. and nominally −70° C. The automatic dehydrator of the present invention will operate on one of the absorption units until that unit is fully saturated, or for 200 hours, whichever condition is reached first. When this occurs, the standby drying canister is brought into service and the used unit is regenerated. The drying canister being regenerated is heated internally with a resistance heater until a temperature is attained which will convert all absorbed water into steam.

The resulting vapor is purged by pumping ambient air through the drying canister and collecting the water in an evaporator where it is again heated and driven off as water vapor. No drain line or special ventilation is needed with standard units. On NEMA type automatic dehydrators, the purge air and steam is evacuated out of the enclosure through a moisture diffuser (supplied) or through a customer supplied drain line via the 1/89'NPT discharge fitting. This eliminates moisture from inside the weather tight enclosure.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An air dehydrator system for supplying a source of dehydrated air, comprising:
    an offsite data management system;
    at least one data network; and
    an air dehydrator located remote from said offsite data management system, said dehydrator including a housing containing:
        at least one drying canister;
        a compressor;
        a control circuit coupled with said compressor, said control circuit also being in communication via said at least one data network with said offsite data management system, said control circuit controlling operation of said compressor dependent upon control by said offsite data management system, said control by said offsite data management system includes a plurality of input control parameters, said input control parameters including
    high pressure alarm level;
    low pressure alarm level;
    a high duty cycle alarm level, said control circuit being configured to determine if said compressor has a duty cycle that exceeds a predetermined percentage, and setting said high duty cycle alarm if said duty cycle exceeds said predetermined percentage.

2. The air dehydrator system of claim 1, further including at least one heater and a plurality of sensors, said plurality of sensors including at least one temperature sensor, at least one pressure sensor, and at least one dew point sensor, each of said sensors providing output data; and
    wherein said control circuit is also coupled with said at least one heater and said plurality of sensors; said control circuit receiving said output data from said plurality of sensors; said control circuit controlling operation of said at least one heater dependent upon said control by said offsite data management system.

3. The air dehydrator system of claim 2, wherein said control circuit effects a display of said output data on said offsite data management system.

4. The air dehydrator system of claim 1, wherein said predetermined percentage is 20%.

5. The air dehydrator system of claim 1, wherein said at least one data network includes at least one of a local area network (LAN), a wide area network (WAN) and a cellular telephone connection.

6. The air dehydrator system of claim 5, wherein said LAN includes at least one of a wireless network and a wired network, and said WAN includes at least one of a wired network and an internet based network.

7. The air dehydrator system of claim 6, wherein said WAN includes an Ethernet connector.

8. The air dehydrator system of claim 6, wherein said LAN includes one of an Ethernet connector, an RS422 connector, an RS232 connector and a wireless adapter.

9. The air dehydrator system of claim 1, wherein said offsite data management system includes a remote host in the form of a computer.

10. The air dehydrator system of claim 1, wherein said air dehydrator includes a main control board within said housing, said main control board having said control circuit thereon.

11. The air dehydrator system of claim 1, wherein said housing is hermetically sealed.

12. The air dehydrator system of claim 1, wherein said predetermined percentage is 50%.

13. The air dehydrator system of claim 1, wherein said offsite data management system includes a remote host, said control circuit controlling operation of said compressor dependent upon control by said remote host.

14. A method of operating an air dehydrator system for supplying a source of dehydrated air, comprising the steps of: providing an air dehydrator including a housing containing: at least one drying canister; a pressurized air source; and a control circuit coupled with said pressurized air source; controlling operation of said air dehydrator with an offsite data management system coupled with said air dehydrator via at least one data network, wherein said control circuit controls operation of said pressurized air source dependent upon control by said offsite data management system; determining if said at least one drying canister has been in service for at least a predetermined time; marking said at least one drying canister for regeneration dependent upon said determining step indicating that said at least one drying canister has been in service for said predetermined time; using said control circuit to determine if said pressurized air source has a duty cycle that exceeds a predetermined percentage; and setting a high duty cycle alarm if said duty cycle exceeds said predetermined percentage.

* * * * *